United States Patent
Kumazaki (10) Patent No.: US 12,403,935 B2
(45) Date of Patent: Sep. 2, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/415,021

(22) Filed: Jan. 17, 2024

(65) Prior Publication Data

US 2024/0326860 A1 Oct. 3, 2024

(30) Foreign Application Priority Data

Mar. 28, 2023 (JP) .................................. 2023-051805

(51) Int. Cl.
*B60W 60/00* (2020.01)
*G01C 21/00* (2006.01)
*G01C 21/34* (2006.01)

(52) U.S. Cl.
CPC ....... *B60W 60/001* (2020.02); *G01C 21/3461* (2013.01); *G01C 21/387* (2020.08); *B60W 2556/40* (2020.02)

(58) Field of Classification Search
CPC ............ B60W 60/001; B60W 2556/40; G01C 21/387; G01C 21/3461
See application file for complete search history.

(56) References Cited

U.S. PATENT DOCUMENTS

| 6,564,224 | B1* | 5/2003 | Wu ....................... G01C 21/387 |
| 11,414,100 | B2* | 8/2022 | Tsuji .................... G01C 21/3407 |
| 11,731,665 | B2* | 8/2023 | Takamatsu ............... B60R 21/00 |
| | | | 701/23 |
| 2017/0123434 | A1* | 5/2017 | Urano .............. G08G 1/096791 |
| 2020/0110422 | A1 | 4/2020 | Takamatsu et al. |
| 2020/0223449 | A1 | 7/2020 | Tsuji et al. |

FOREIGN PATENT DOCUMENTS

| JP | 6411956 B2 | 10/2018 |
| JP | 6721118 B2 | 7/2020 |
| JP | 6819788 B2 | 1/2021 |

* cited by examiner

*Primary Examiner* — Ramsey Refai
(74) *Attorney, Agent, or Firm* — Oliff PLC (57) ABSTRACT

A vehicle controller includes a processor configured to detect an inconsistent section where information on a road represented in a first map is inconsistent with information on the road represented in a second map, make a first driving plan for a first section from a current position of a vehicle to a control switching point which is a start point of the inconsistent section or is nearer the vehicle than the start point, based on one of the first and second maps, make a second driving plan for a second section beyond the control switching point including the inconsistent section, based on the other of the first and second maps, before the vehicle reaches the control switching point, and control the vehicle so as to follow the first driving plan on the first section and follow the second driving plan on the second section.

5 Claims, 7 Drawing Sheets

VEHICLE CONTROLLER, METHOD, AND COMPUTER PROGRAM FOR VEHICLE CONTROL

FIELD

The present invention relates to a vehicle controller, a method, and a computer program for vehicle control.

BACKGROUND

A technique to execute autonomous driving control of a vehicle by referring to map information has been researched. However, vehicles may travel in an area where map information is not very accurate. Thus, a technique to achieve continuing autonomous driving even during travel in an area where map information is not very accurate has been proposed (see Japanese Patent JP6721118B).

A method of driving control disclosed in JP6721118B includes calculating a route from a current position of a vehicle to a destination by referring to map information including a first map with identification information on a travel lane and a second map without identification information on a travel lane. The method further includes setting first driving control during travel along a first path in the route belonging to the first map; setting second driving control, in which the number of types of executable control is less than that in the first driving control, during travel along a second path in the route belonging to the second map; and making a driving plan for the vehicle to travel along the route according to the set driving control. The method further includes presenting the driving plan, in which a point where control will switch between the first driving control and the second driving control is included, to an occupant of the vehicle before executing the driving plan.

SUMMARY

In some cases, multiple maps can be used for making a travel plan for the same road section. In such cases, it is desirable to appropriately determine a point where maps used for making a travel plan will be switched among these maps. In the case where maps used will be switched, it is also desirable to appropriately set a timing for making a driving plan.

It is an object of the present invention to provide a vehicle controller that can make a driving plan at an appropriate timing in the case where maps used will be switched.

According to an embodiment, a vehicle controller is provided. The vehicle controller includes a memory configured to store a first map and a second map each representing information on a road; and a processor configured to: detect, in a travel direction of a vehicle, an inconsistent section where information on the road represented in the first map is inconsistent with information on the road represented in the second map, the road being traveled by the vehicle, make a first driving plan for a first section from a current position of the vehicle to a control switching point which is a start point of the inconsistent section, which is an end of the inconsistent section closer to the vehicle, or is nearer the vehicle than the start point, based on one of the first and second maps, make a second driving plan for a second section beyond the control switching point including the inconsistent section, based on the other of the first and second maps, which differs from the one used for the first section, before the vehicle reaches the control switching point, control the vehicle so that the vehicle travels on the first section according to the first driving plan, and control the vehicle so that the vehicle travels on the second section according to the second driving plan.

In one embodiment, the processor of the vehicle controller makes the first driving plan, based on the first map, and makes the second driving plan, based on the second map; the information on the road represented in the first map is more accurate than the information on the road represented in the second map; and the second map is updated more frequently than the first map.

In one embodiment, the processor of the vehicle controller detects the inconsistent section so that the distance between the position of a predetermined feature on or around the road represented in the first map and the position of a corresponding predetermined feature represented in the second map is not less than a predetermined threshold, or so as to include a point where the first and second maps differ in the presence or absence of the predetermined feature.

According to another embodiment, a method for vehicle control is provided. The method includes detecting, in a travel direction of a vehicle, an inconsistent section where information on a road represented in a first map is inconsistent with information on the road represented in a second map, the road being traveled by the vehicle. The method further includes making a first driving plan for a first section from a current position of the vehicle to a control switching point which is a start point of the inconsistent section, which is an end of the inconsistent section closer to the vehicle, or is nearer the vehicle than the start point, based on one of the first and second maps; making a second driving plan for a second section beyond the control switching point including the inconsistent section, based on the other of the first and second maps, which differs from the one used for the first section, before the vehicle reaches the control switching point; controlling the vehicle so that the vehicle travels on the first section according to the first driving plan; and controlling the vehicle so that the vehicle travels on the second section according to the second driving plan.

According to still another embodiment, a non-transitory recording medium that stores a computer program for vehicle control is provided. The computer program includes instructions causing a processor mounted on a vehicle to execute a process including detecting, in a travel direction of the vehicle, an inconsistent section where information on a road represented in a first map is inconsistent with information on the road represented in a second map, the road being traveled by the vehicle. The process further includes making a first driving plan for a first section from a current position of the vehicle to a control switching point which is a start point of the inconsistent section, which is an end of the inconsistent section closer to the vehicle, or is nearer the vehicle than the start point, based on one of the first and second maps; making a second driving plan for a second section beyond the control switching point including the inconsistent section, based on the other of the first and second maps, which differs from the one used for the first section, before the vehicle reaches the control switching point; controlling the vehicle so that the vehicle travels on the first section according to the first driving plan; and controlling the vehicle so that the vehicle travels on the second section according to the second driving plan.

The vehicle controller according to the present disclosure has an advantageous effect of being able to make a driving plan at an appropriate timing in the case where maps used will be switched.

DESCRIPTION OF EMBODIMENTS

A vehicle controller, a method for vehicle control executed by the vehicle controller, and a computer program for vehicle control will now be described with reference to the attached drawings. The vehicle controller makes a travel plan, using one of two maps, and makes a vehicle travel according to the made travel plan. More specifically, the vehicle controller detects an inconsistent section where two pieces of information on a road being traveled by the vehicle represented in the two maps are inconsistent with each other, in a section from the current position of the vehicle to a predetermined distance away in the travel direction of the vehicle. The vehicle controller makes a first driving plan for a first section from the current position of the vehicle to a control switching point which is a start point of the inconsistent section, which is an end of the inconsistent section closer to the vehicle, or is nearer the vehicle than the start point, based on one of first and second maps. In addition, the vehicle controller makes a second driving plan for a second section beyond the control switching point including the inconsistent section, based on the other of the first and second maps, which differs from the one used for the first section. The vehicle controller controls the vehicle so that the vehicle travels on the first section according to the first driving plan and travels on the second section according to the second driving plan.

In the present embodiment, a driving plan refers to a plan of action that the vehicle or the vehicle controller is to take in the future. For example, when a road leading toward a destination of the vehicle diverges from a road being traveled by the vehicle, a driving plan includes one or more lane changes that will be made before reaching the fork where the road diverges. Similarly, when the vehicle is going to turn right or left at an intersection a predetermined distance ahead to go to a destination, a driving plan includes one or more lane changes that will be made before reaching the intersection. A driving plan may further include control of the vehicle speed depending on the structure or the regulation speed of the road being traveled by the vehicle. A driving plan may further include termination of autonomous driving control at a predetermined distance ahead of the current position of the vehicle in the road being traveled by the vehicle (i.e., takeover of driving to the driver).

In the present embodiment, the two maps each include information used for making a driving plan, e.g., information indicating the types of features, such as road markings including lane lines, curbstones, signposts, and roadside signboards, and information indicating the positions of these features, as the information on a road. These two maps are preferably updated at different timings. In the present embodiment, the timing of update of a map refers to that of update of information on a road represented in the map. For example, in the case where a map server that manages maps or delivers maps to vehicles updates information on a predetermined road section in one of the maps at a first date and time, the first date and time is the timing of update of the map.

Of the two maps, a map representing information on a road more accurately is preferably set as a map used normally (hereafter a "first map"). This increases the possibility of making an appropriate driving plan. It is assumed that information on a road represented in a map is more accurate as the error in the position of a feature on or around the road represented in the map is smaller or the degree of reliability of the type and the presence or absence of the feature is higher. Thus the accuracy of the position of a feature and the degree of reliability of the type and the presence or absence of the feature in a road section unchanged after the last update of the first map and the other map (hereafter a "second map") are preferably higher in the first map than in the second map. However, the accuracies of information on the road of the two maps may be the same.

The second map is preferably updated more frequently than the first map. This may result in, for example, the timing of the last update of the second map being later than construction in a predetermined road section, even if the first map is last updated before the construction in the predetermined road section and thus does not represent correct information on the predetermined road section. For this reason, the second map may represent correct information on the predetermined road section. Thus the use of the first and second maps for different purposes enables the vehicle controller to make appropriate driving plans.

Figure 1:
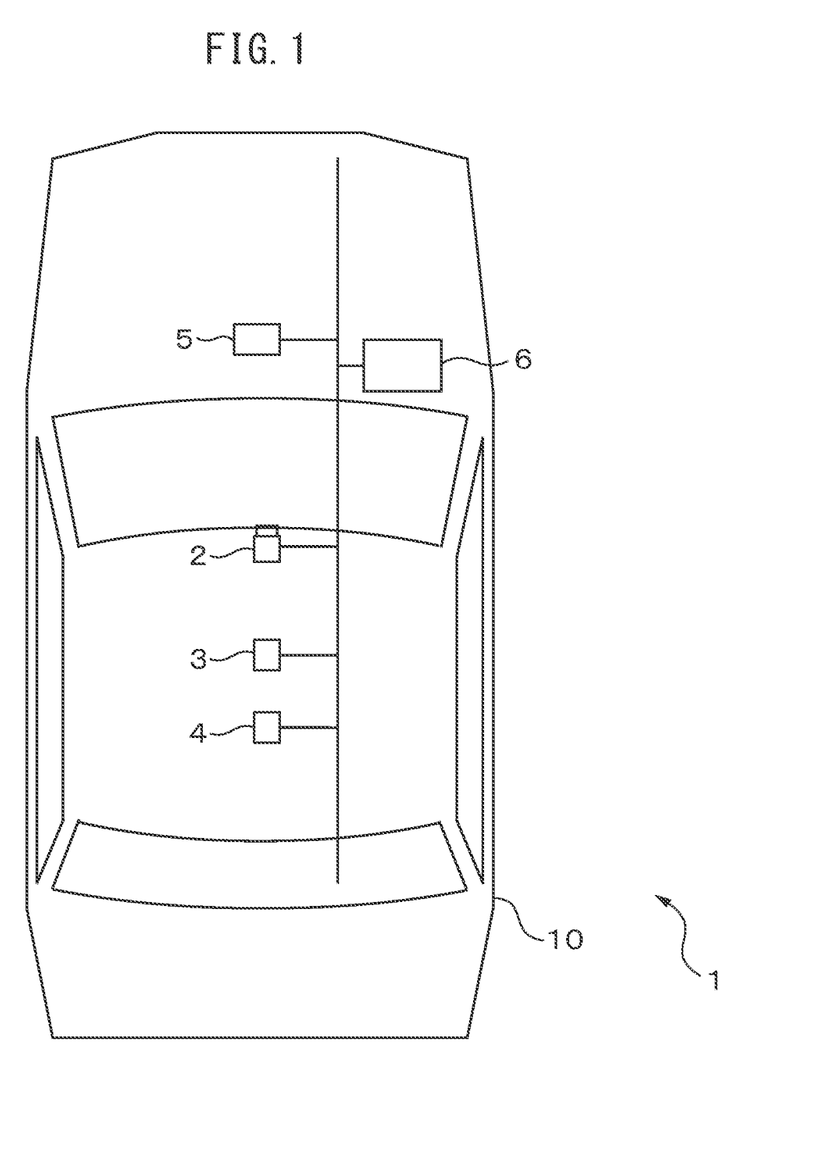
FIG. 1 schematically illustrates the configuration of a vehicle control system equipped with a vehicle controller.
Figure 2:
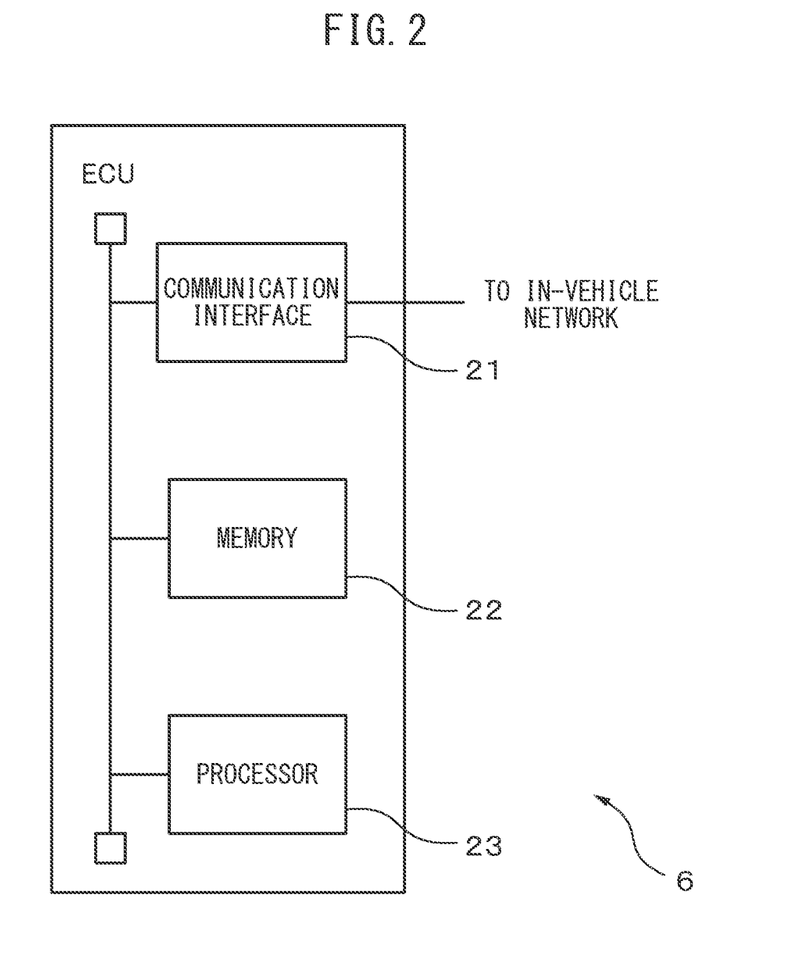
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a camera 2, a GPS receiver 3, a wireless communication terminal 4, a storage device 5, and an electronic control unit (ECU) 6, which is an example of the vehicle controller. The camera 2, the GPS receiver 3, the wireless communication terminal 4, and the storage device 5 are communicably connected to the ECU 6 via an in-vehicle network conforming to a standard such as a controller area network. The vehicle control system 1 may further include a range sensor (not illustrated) that measures the distances from the vehicle 10 to objects around the vehicle 10, such as LiDAR or radar. The vehicle control system 1 may further include a navigation device (not illustrated) for searching for a route to a destination.

The camera 2, which is an example of a sensor that generates a sensor signal representing the surroundings of the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes a picture of a region in front of the vehicle 10 every predetermined capturing period (e.g., 1/30 to 1/10 seconds), and generates images representing this region. Each image obtained by the camera 2 is an example of the sensor signal. The vehicle 10 may include multiple cameras taking pictures in different orientations or having different focal lengths.

Every time an image is generated, the camera 2 outputs the generated image to the ECU 6 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the ECU 6 via the in-vehicle network at predetermined intervals. Instead of the GPS receiver, the vehicle 10 may include a receiver that receives positioning signals from satellites of another satellite positioning system to determine the position of the vehicle 10.

The wireless communication terminal 4 communicates with a wireless base station by wireless in conformity with a predetermined standard of mobile communications. The wireless communication terminal 4 receives map information representing a first map or a second map or update information of the first or second map from a map server via the wireless base station. The wireless communication terminal 4 outputs the received map information or update information to the storage device 5 via the in-vehicle network.

The storage device 5, which is an example of the storage unit, includes, for example, a hard disk drive, a nonvolatile semiconductor memory, or an optical medium and an access device therefor. The storage device 5 stores the first and second maps, and stores, for each of the first and second maps, update information indicating the dates and times of the last update of information on individual road sections represented in the map.

The storage device 5 further includes a processor for executing, for example, a process to update the first or second map and a process related to a request from the ECU 6 to read out a map. For example, every time the vehicle 10 moves a predetermined distance, the storage device 5 transmits a request to obtain first and second maps, together with the current position of the vehicle 10, to the map server via the wireless communication terminal 4. The storage device 5 then receives map information including the first and second maps of a predetermined region around the current position of the vehicle 10 from the map server via the wireless communication terminal 4, and stores the first and second maps included in the received map information. When update information of the first or second map is received via the wireless communication terminal 4, the storage device 5 stores the update information. When a request from the ECU 6 to read out a map is received, the storage device 5 cuts out that portion of the first and second maps stored therein which includes the current position of the vehicle 10 and which represents a region smaller than the predetermined region, and outputs the cutout portion to the ECU 6 via the in-vehicle network.

The ECU 6 executes autonomous driving control of the vehicle 10. In the present embodiment, the ECU 6 makes a driving plan, based on the first or second map, and executes autonomous driving control of the vehicle 10 to make the vehicle 10 travel according to the made driving plan.

As illustrated in FIG. 2, the ECU 6 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 6 to the in-vehicle network. Every time an image is received from the camera 2, the communication interface 21 passes the received image to the processor 23. Every time positioning information is received from the GPS receiver 3, the communication interface 21 passes the positioning information to the processor 23. In addition, the communication interface 21 passes the first and second maps and update information read from the storage device 5 to the processor 23.

The memory 22, which is another example of the storage unit, includes, for example, volatile and nonvolatile semiconductor memories, and stores various types of data used in a vehicle control process executed by the processor 23. For example, the memory 22 stores images of the surroundings of the vehicle 10 received from the camera 2, positioning information of the vehicle 10 received from the GPS receiver 3, and the first and second maps and update information read from the storage device 5. The memory 22 further stores parameters of the camera 2, such as the focal length, the orientation, and the mounted position, as well as various parameters for specifying a classifier for object detection, which is used for detecting, for example, a feature. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 3:
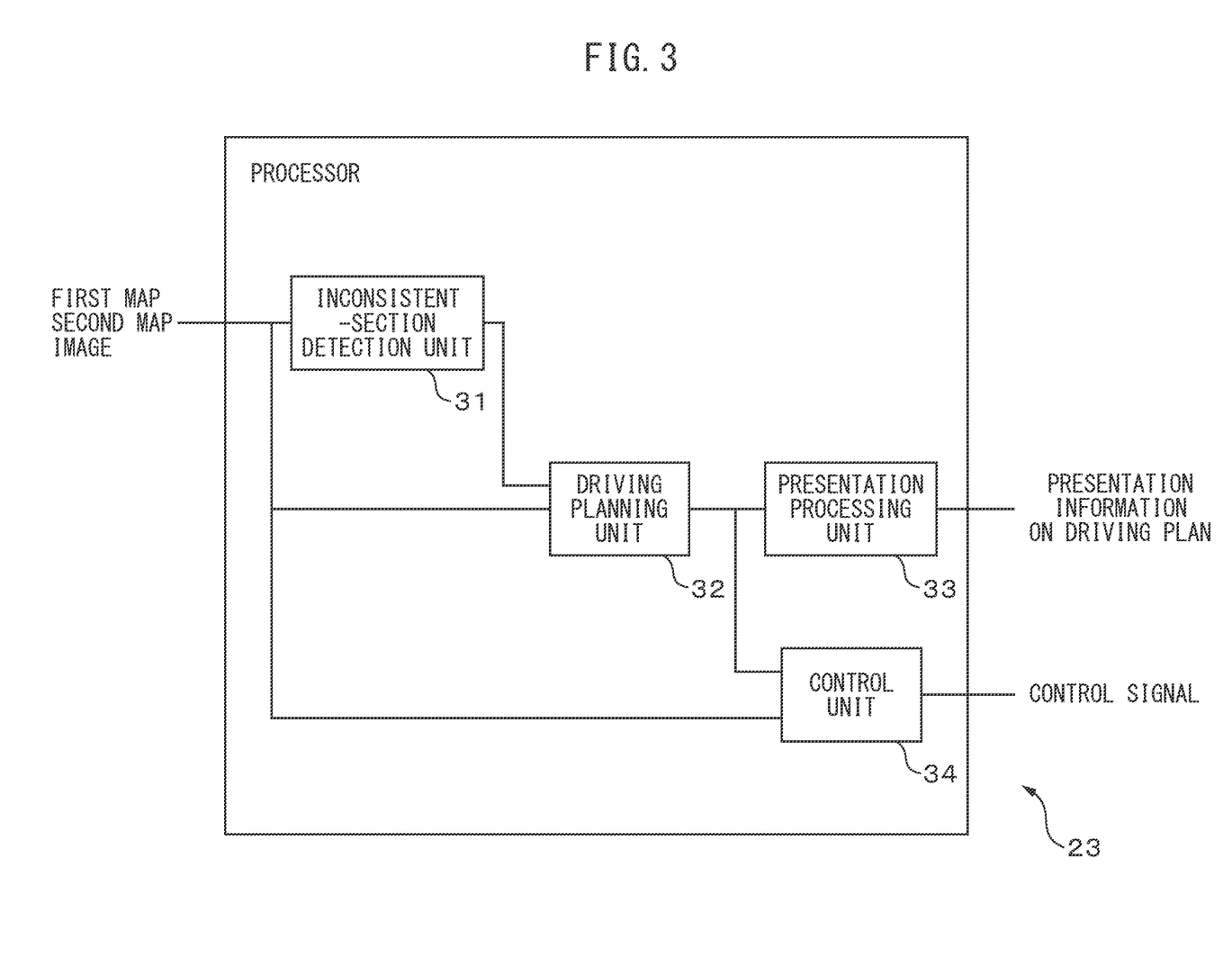
FIG. 3 is a functional block diagram of a processor of the electronic control unit, related to a vehicle control process.

FIG. 3 is a functional block diagram of the processor 23, related to the vehicle control process. The processor 23 includes an inconsistent-section detection unit 31, a driving planning unit 32, a presentation processing unit 33, and a control unit 34. These units included in the processor 23 are functional modules, for example, implemented by a computer program executed by the processor 23, or may be dedicated operating circuits provided in the processor 23.

The inconsistent-section detection unit 31 detects an inconsistent section where information on a road being traveled by the vehicle 10 represented in the first map is inconsistent with the information represented in the second map, in a section from the current position of the vehicle 10 to a predetermined distance away in the travel direction of the vehicle 10.

To achieve this, the inconsistent-section detection unit 31 determines the position of the vehicle 10 indicated by the latest positioning information as the current position of the vehicle 10. The inconsistent-section detection unit 31 identifies the travel direction of the vehicle 10, based on the changes in the position of the vehicle 10 indicated by the latest pieces of positioning information or on a sensor signal indicating the orientation of the vehicle 10 received by the ECU 6 from an orientation sensor (not illustrated) mounted on the vehicle 10. In addition, the inconsistent-section detection unit 31 identifies the road including the current position of the vehicle 10 as the road being traveled by the vehicle 10, by referring to the first or second map being used for making a driving plan at present.

The inconsistent-section detection unit 31 sets sampling points at first intervals (e.g., intervals of several hundred meters to 1 km) in the section from the current position of the vehicle 10 to a predetermined distance away along the travel direction of the vehicle 10. For each sampling point, the inconsistent-section detection unit 31 calculates the distance between the position of a feature on or around the road being traveled by the vehicle 10 (e.g., a lane line, a curbstone, a guardrail, or a signpost) represented in the first map at the sampling point and the position of a corresponding feature represented in the second map, as the degree of inconsistency. When a feature extending along the road, such as a lane line in the above-described example, is used for calculating the degree of inconsistency, the inconsistent-section detection unit 31 calculates the distance to that position in a corresponding feature represented in the second map which is closest to the position of the feature represented in the first map at a sampling point of interest, as the degree of inconsistency. The inconsistent-section detection unit 31 may calculate an average of the distances between the positions of features represented in the first map at a sampling point of interest and those of corresponding features represented in the second map, as the degree of inconsistency.

The inconsistent-section detection unit 31 compares the degrees of inconsistency calculated for the respective sampling points with a predetermined threshold, and identifies a sampling point where the degree of inconsistency is not less than the predetermined threshold. In front of and behind the sampling point where the degree of inconsistency is not less than the predetermined threshold, the inconsistent-section detection unit 31 resets sampling points at second intervals (e.g., intervals of several dozen meters to 100 m) each of which is shorter than the first interval. For each reset sampling point, the inconsistent-section detection unit 31 calculates the degree of inconsistency between the first and second maps in the same manner as described above. Among the reset individual sampling points, the inconsistent-section detection unit 31 identifies sampling points where the degree of inconsistency is not less than the predetermined threshold. The inconsistent-section detection unit 31 then detects a section from the sampling point previous to the one closest to the vehicle 10 of the sampling points where the degree of inconsistency is not less than the predetermined threshold to the sampling point next to the one farthest from the vehicle 10 of the sampling points where the degree of inconsistency is not less than the predetermined threshold, as an inconsistent section. The inconsistent-section detection unit 31 may detect multiple inconsistent sections by repeating the above-described processing.

Figure 4A:
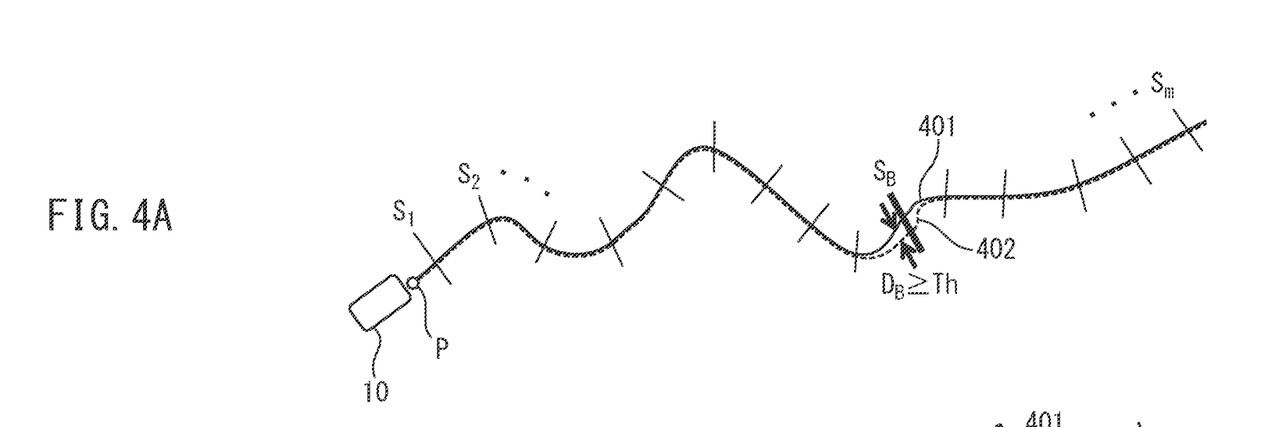
FIG. 4A schematically illustrates an example of the relationship between the degree of inconsistency of two maps and an inconsistent section.
Figure 4B:
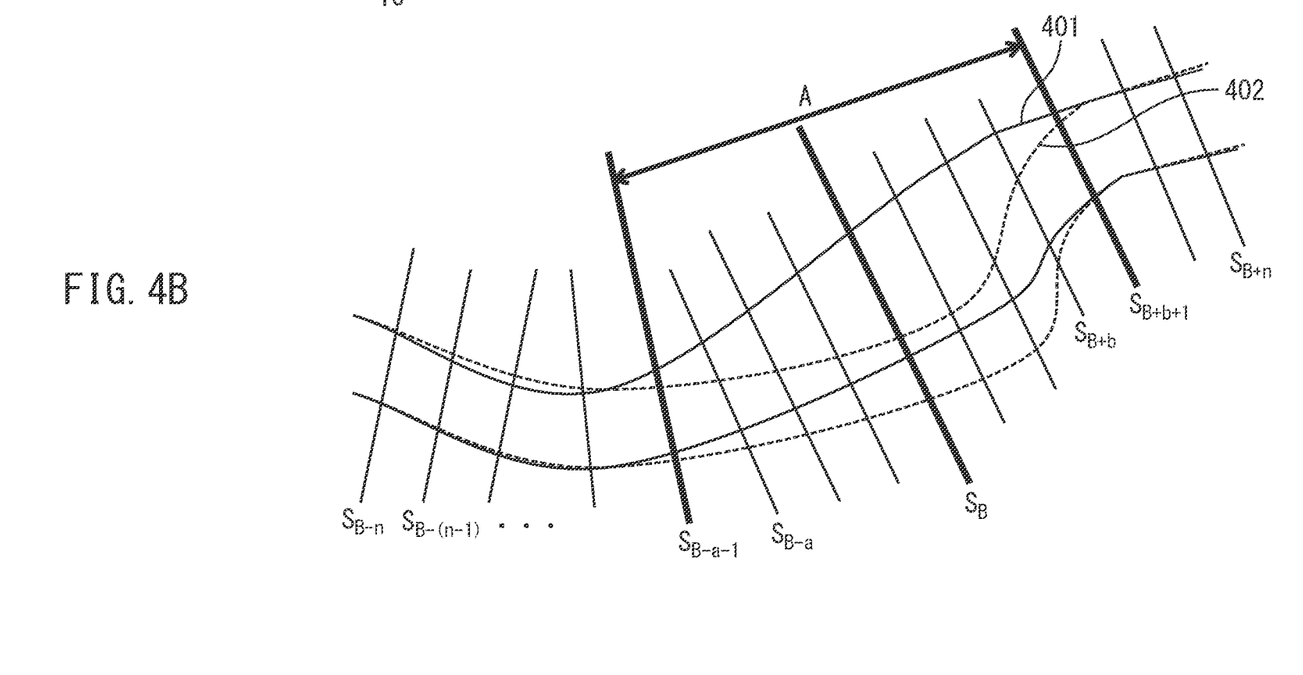
FIG. 4B schematically illustrates an example of the relationship between the degree of inconsistency of two maps and an inconsistent section.

FIGS. 4A and 4B schematically illustrate an example of the relationship between the degree of inconsistency of two maps and an inconsistent section. In FIG. 4A, the vehicle 10 is exaggerated. As illustrated in FIG. 4A, sampling points $S_i$ (i=1, 2, . . . , m) are set on a road being traveled by the vehicle 10 from the current position P of the vehicle 10 at first intervals. For each sampling point $S_i$ is calculated the degree of inconsistency $D_i$ between a lane line 401 represented in the first map and a corresponding lane line 402 represented in the second map. In this example, the degree of inconsistency $D_B$ is not less than a predetermined threshold Th at a sampling point $S_B$.

Hence, as illustrated in FIG. 4B, sampling points $S_j$ (j=B−n, B−(n−1), . . . , B−1, B, B+1, . . . , B+n) are reset in front of and behind the sampling point $S_B$ at second intervals. For each sampling point $S_j$, the degree of inconsistency $D_j$ between the lane line 401 represented in the first map and the corresponding lane line 402 represented in the second map is calculated. In this example, the degree of inconsistency $D_j$ is not less than the predetermined threshold Th in a section from a sampling point $S_{B-a}$ to a sampling point $S_{B+b}$. Hence, a section from a sampling point $S_{B-a-1}$ previous to the sampling point $S_{B-a}$ to a sampling point $S_{B+b+1}$ next to the sampling point $S_{B+b}$ is identified as an inconsistent section A.

The inconsistent-section detection unit 31 may set the degree of inconsistency not less than the predetermined threshold for a sampling point where the first and second maps differ in the number of lanes or the number of lane lines. The inconsistent-section detection unit 31 may also set the degree of inconsistency not less than the predetermined threshold for a sampling point where the first and second maps differ in the type of lane line. In addition, the inconsistent-section detection unit 31 may set a point where the first and second maps differ in the presence or absence of a predetermined feature, such as a signpost or a guardrail, as a sampling point whose degree of inconsistency is not less than the predetermined threshold.

According to a modified example, the inconsistent-section detection unit 31 may calculate the degree of inconsistency as in the embodiment for each of points spaced at predetermined intervals (e.g., intervals of several dozen meters to 100 m) along the travel direction of the vehicle 10 in ascending order of distance from the current position of the vehicle 10. Then the inconsistent-section detection unit 31 determines a point where the degree of inconsistency first exceeds a first threshold (e.g., the same threshold as the predetermined threshold) as the start point of an inconsistent section, which is an end closer to the vehicle 10. Among the points farther from the vehicle 10 than the start point of the inconsistent section, the inconsistent-section detection unit 31 determines a point where the degree of inconsistency first falls below a second threshold, as the end point of the inconsistent section, which is the other end farther from the vehicle 10. The second threshold for identifying the end point of an inconsistent section may be set less than the first threshold for identifying the start point of an inconsistent section. This reduces the occurrence of setting of inconsistent sections alternating with other sections in a short distance or erroneous detection of the end point of an inconsistent section. The thresholds are preferably set to values greater than the average, median, or mode of the errors in the positions of individual features represented in the first and second maps. This prevents a point where information on a road represented in the first map is substantially the same as information on the road represented in the second map from being erroneously included in an inconsistent section.

When the distance between two successive inconsistent sections is less than a predetermined distance threshold (e.g., several hundred meters to 1 km), the inconsistent-section detection unit 31 may set a continuous section including these two inconsistent sections as a new single inconsistent section. Similarly, when the distances between two successive inconsistent sections among three or more inconsistent sections are less than the distance threshold, the inconsistent-section detection unit 31 may set a continuous section including these three or more inconsistent sections as a new single inconsistent section. This prevents frequent switches of maps used for producing a travel plan and thus prevents frequent switching of travel plans, which prevents unnatural motion of the vehicle 10 and thus prevents making the driver unnecessarily anxious.

Figure 5:
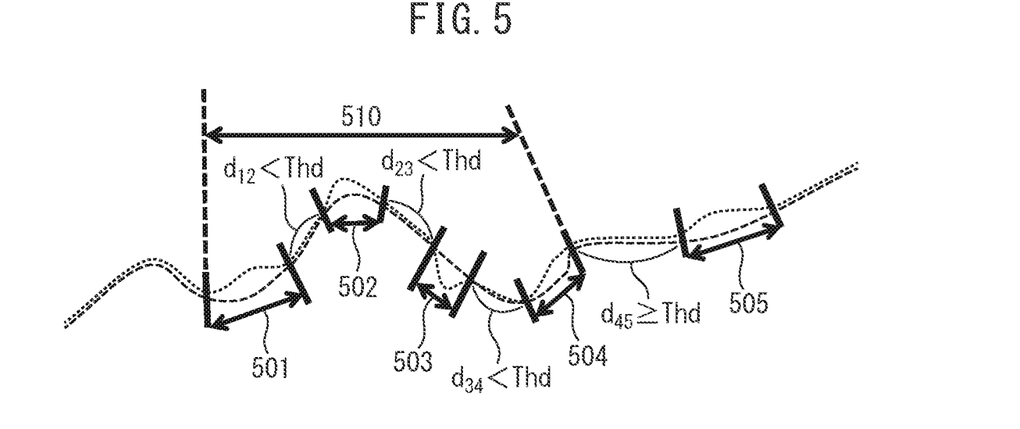
FIG. 5 schematically illustrates an example of detection of an inconsistent section according to a modified example.

FIG. 5 schematically illustrates an example of detection of an inconsistent section according to this modified example. In the example illustrated in FIG. 5, five inconsistent sections 501 to 505 are detected on the basis of the degrees of inconsistency at individual points on a road being traveled by the vehicle 10. However, the distance $d_{12}$ between the inconsistent sections 501 and 502 is less than a predetermined distance threshold Thd. Similarly, the distance $d_{23}$ between the inconsistent sections 502 and 503 and the distance $d_{34}$ between the inconsistent sections 503 and 504 are also less than the predetermined distance threshold Thd. In contrast, the distance $d_{45}$ between the inconsistent sections 504 and 505 is not less than the predetermined distance threshold Thd. Hence, a section 510 from the start point of the inconsistent section 501 to the end point of the inconsistent section 504 is newly detected as an inconsistent section. However, the inconsistent section 505 remains separate from the inconsistent section 510.

The inconsistent-section detection unit 31 notifies the driving planning unit 32 of the start point and the end point of the detected inconsistent section.

The driving planning unit 32 makes a driving plan from the current position of the vehicle 10 to a predetermined distance ahead, based on the first or second map. In the present embodiment, the driving planning unit 32 makes a first driving plan for a first section from a current position of the vehicle 10 to a control switching point which is a start point of the inconsistent section or is nearer the vehicle 10 than the start point, based on one of the first and second maps. The control switching point is set, for example, a control switching offset distance nearer the current position of the vehicle 10 than the start point of the inconsistent section. The control switching offset distance is set, for example, to 0 m to several hundred meters. In particular, setting the control switching offset distance to a nonzero distance, e.g., to 100 m to several hundred meters prevents a sudden change of driving plans even when motion of the vehicle 10 needs to change at a point near the start point. The one of the maps used for making a first driving plan may be any one of the first and second maps, that has been used for making a driving plan followed by the vehicle 10 at the current position of the vehicle 10.

Further, the driving planning unit 32 makes a second driving plan for a second section beyond the control switching point, based on the other of the first and second maps, which differs from the one used for the first section, before the vehicle 10 reaches the control switching point. The second section is set as a section from the control switching point to an end point of the inconsistent section, which is an end farther from the vehicle 10, or a point near the end point, so as to include the inconsistent section.

When the first map is more accurate than the second map regarding information on the road, as described above, the driving planning unit 32 preferably makes a driving plan for the first section, where information represented in the first map is not inconsistent with information represented in the second map, based on the first map. When the second map is updated more frequently than the first map, the driving planning unit 32 preferably makes a driving plan for the second section beyond the control switching point including the inconsistent section, based on the second map. However, the use of the maps is not limited to this example. When the first map is substantially as accurate as the second map regarding information on the road, the driving planning unit 32 may make a driving plan for the first section, based on the second map. When the time elapsed since the last update of the first map is shorter than the time elapsed since the last update of the second map regarding information on the road in the second section, the driving planning unit 32 preferably makes a driving plan for the second section beyond the control switching point, based on the first map. In the following, the map used for making a driving plan for a first section will be referred to as the "current map", and the map used for making a driving plan for a second section as the "alternative map," for convenience of description.

By referring to the current map, the driving planning unit 32 detects a point in the first section serving as a trigger of action that the vehicle 10 is to take. For example, the driving planning unit 32 determines whether there is a fork in the first section at which a lane leading toward a destination of the vehicle 10 diverges from the road being traveled by the vehicle 10, by referring to the current map and a travel route to the destination received by the ECU 6 from a navigation device (not illustrated). When there is such a fork, the driving planning unit 32 determines whether the lane being traveled by the vehicle 10 (hereafter the "host vehicle lane") differs from the lane leading toward the destination. When the host vehicle lane differs from the lane leading toward the destination, the driving planning unit 32 makes a driving plan to make one or more lane changes in which the lane leading toward the destination is a target lane.

To determine whether the host vehicle lane differs from the target lane, the driving planning unit 32 detects the host vehicle lane. Specifically, the driving planning unit 32 detects the host vehicle lane by comparing an image representing the surroundings of the vehicle 10 and generated by the camera 2 (hereafter simply an "image") with the current map. For example, assuming the position and orientation of the vehicle 10, the driving planning unit 32 projects features on or around the road detected from an image onto the current map or features on or around the road in the vicinity of the vehicle 10 represented in the current map onto the image. The features on or around the road may be, for example, road markings such as lane lines or stop lines, or curbstones. The driving planning unit 32 then estimates the actual position of the vehicle 10 to be the position and orientation of the vehicle 10 for the case where the features detected from the image match those represented in the current map the best, and detects a lane including the position of the vehicle on the current map as the host vehicle lane.

The driving planning unit 32 uses initial values of the assumed position and orientation of the vehicle 10 and parameters of the camera 2, such as the focal length, the height of the mounted position, and the orientation, to determine the positions in the current map or the image to which the features are projected. As the initial values of the position and orientation of the vehicle 10 is used the latest position of the vehicle 10 measured by the GPS receiver 3 or the position obtained by correcting, with odometry information, the position and orientation of the vehicle 10 estimated at the last detection of the host vehicle lane. The driving planning unit 32 then calculates the degree of matching between the features on or around the road detected from the image and the corresponding features represented in the current map (e.g., the inverse of the sum of squares of the distances between corresponding features).

The driving planning unit 32 repeats the above-described processing while varying the assumed position and orientation of the vehicle 10, and estimates the actual position of the vehicle 10 to be the assumed position and orientation for the case where the degree of matching is a maximum. The driving planning unit 32 then identifies the lane including the position of the vehicle 10 as the host vehicle lane by referring to the current map.

For example, the driving planning unit 32 inputs an image into a classifier that has been trained to detect detection target features from an image, thereby detecting these features. As such a classifier, the driving planning unit 32 can use a deep neural network (DNN) having architecture of a convolutional neural network (CNN) type, such as Single Shot MultiBox Detector or Faster R-CNN. Alternatively, as such a classifier, the driving planning unit 32 may use a DNN having architecture of a self-attention network (SAN) type, such as Vision Transformer.

In addition, the driving planning unit 32 identifies the target lane by referring to the current map and the travel route. The driving planning unit 32 then determines whether the host vehicle lane is the same as the target lane by referring to the current map. When the host vehicle lane is not the same as the target lane, the driving planning unit 32 determines that the host vehicle lane differs from the target lane. When the host vehicle lane differs from the target lane, the driving planning unit 32 further counts the number of lanes from the host vehicle lane to the target lane by referring to the current map, and makes a driving plan to make as many lane changes as the number of lanes.

Similarly, the driving planning unit 32 determines whether there is an intersection in the first section at which the vehicle 10 will turn right or left to go to the destination of the vehicle 10 from the road being traveled by the vehicle 10, by referring to the current map and the travel route to the destination. When there is such an intersection, the driving planning unit 32 determines whether the host vehicle lane differs from a lane where a right or left turn is allowed (hereafter a "right- or left-turn lane"). When the host vehicle lane differs from a right- or left-turn lane, the driving planning unit 32 makes a driving plan to make one or more lane changes in which the right- or left-turn lane is a target lane.

Further, the driving planning unit 32 determines whether in the first section there is a section whose regulation speed differs from the regulation speed at the current position of the vehicle 10. When there is such a section, the driving planning unit 32 makes a driving plan to change a target speed of the vehicle 10 to the regulation speed of this section at entry into this section.

Further, the driving planning unit 32 determines whether there is a point in the first section at which autonomous driving control will be finished (e.g., a way in and out of an expressway). When there is such a point, the driving planning unit 32 makes a driving plan to transfer driving control to the driver before reaching this point.

When there is not a point in the first section serving as a trigger of action that the vehicle 10 is to take, the driving planning unit 32 makes a driving plan for the vehicle 10 to continue travel on the host vehicle lane.

The driving planning unit 32 makes a driving plan for a second section beyond the control switching point, similarly to the driving plan for the first section. However, regarding the second section, the driving planning unit 32 refers to the alternative map to detect a point serving as a trigger of action that the vehicle 10 is to take, unlike the first section. To determine whether the host vehicle lane differs from a target lane, the driving planning unit 32 also refers to the alternative map. In this way, a driving plan for an inconsistent section is made before the vehicle 10 reaches the inconsistent section. This prevents a sudden change of driving plans even in the case where maps used for making a driving plan will be switched, which prevents the driver from feeling unnatural because of a change of driving plans. In the following, a driving plan for a first section will be referred to as a "first driving plan," and a driving plan for a second section as a "second driving plan," for convenience of description.

The driving planning unit 32 may make a driving plan for a section beyond the end point of the inconsistent section, by referring to the current map again.

The driving planning unit 32 notifies the presentation processing unit 33 and the control unit 34 of the made first and second driving plans.

The presentation processing unit 33 notifies the driver of the made first and second driving plans via a notification device (not illustrated) provided in the vehicle interior. In the present embodiment, the presentation processing unit 33 presents the first driving plan to the driver via the notification device until the vehicle 10 reaches a display switching point that is set a display switching offset distance nearer the current position of the vehicle 10 than the inconsistent section. When the vehicle 10 reaches the display switching point, the presentation processing unit 33 switches the driving plan presented to the driver via the notification device from the first driving plan to the second driving plan. The presentation processing unit 33 determines whether the vehicle 10 has reached the display switching point, based on the latest position of the vehicle 10 measured by the GPS receiver 3. The display switching offset distance is set to a value greater than the control switching offset distance, e.g., to several hundred meters to 1 km. In other words, the display switching point is set nearer the current position of the vehicle 10 than the control switching point.

In this way, the presentation processing unit 33 switches the driving plan presented to the driver from the first driving plan to the second driving plan before the vehicle 10 reaches a point at which control of the vehicle 10 will be actually switched. Since this prevents presented driving plans from being switched immediately before a change in motion of the vehicle 10, the presentation processing unit 33 can make it unlikely that the driver will feel uneasy or unnatural about the presented driving plan and motion of the vehicle 10.

Figure 6:
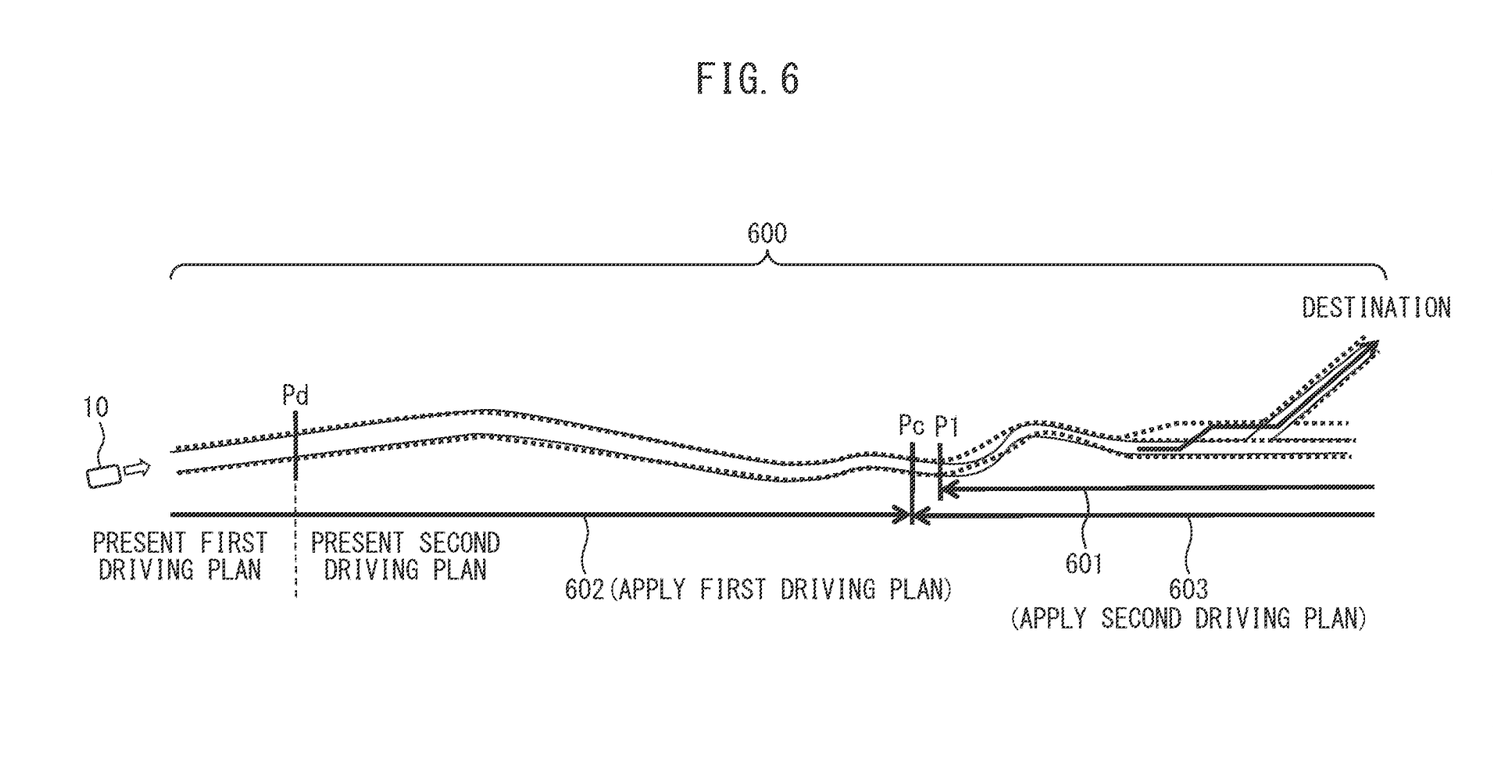
FIG. 6 is a schematic diagram illustrating an inconsistent section, made driving plans, and their display timings.

FIG. 6 is a schematic diagram illustrating an inconsistent section, made driving plans, and their display timings. In FIG. 6, information on a lane represented in the first map is depicted with solid lines, and information on a lane represented in the second map with dotted lines, regarding a road 600 being traveled by the vehicle 10. As illustrated in the figure, information on the road 600 represented in the first map is inconsistent with information on the road 600 represented in the second map, in a section 601 farther from the vehicle 10 than a point P1. In other words, the section 601 is an inconsistent section. The first and second maps indicate that a lane leading toward a destination diverges from the road 600 in the inconsistent section 601. It is assumed that regarding the inconsistent section 601, the update timing of the second map is later than that of the first map, and that the second map represents the latest information on the inconsistent section 601.

In the present embodiment, a first driving plan is made for a first section 602 closer to the current position of the vehicle 10 than a control switching point Pc, based on the first map, which is the current map; the control switching point is closer to the vehicle by a control switching offset distance than the point P1, from which the inconsistent section 601 starts. In this example, there is not a point serving as a trigger of action that the vehicle 10 is to take, in the first section 602. Hence, a first driving plan to travel along the host vehicle lane being traveled by the vehicle 10 is made. For a second section 603 beyond the control switching point Pc including the inconsistent section 601, a second driving plan is made based on the second map, which is the alternative map. In this particular example, the first map, which is the current map, indicates that the lane leading toward a destination diverges from the host vehicle lane whereas the second map, which is the alternative map, indicates that the lane leading toward a destination diverges from a lane adjacent to the host vehicle lane. Hence, a second driving plan to make one or more lane changes from the host vehicle lane to the lane leading toward a destination is made. In this way, the alternative map is used for making a driving plan for the second section 603 to make appropriate driving plans.

In the first section 602, the vehicle 10 is controlled according to the first driving plan whereas in the second section 603, the vehicle 10 is controlled according to the second driving plan. In addition, the first driving plan is presented to the driver until the vehicle 10 reaches a display switching point Pd closer to the vehicle by a display switching offset distance than the point P1. After the vehicle 10 passes the display switching point Pd, the second driving plan is presented to the driver.

For example, when one or more lane changes are planned in the presented driving plan, the presentation processing unit 33 causes an image or an icon indicating the one or more lane changes to appear on a display, which is an example of the notification device. Alternatively, the presentation processing unit 33 may output a voice signal representing the one or more lane changes from a speaker, which is another example of the notification device. Similarly, when a right or left turn of the vehicle 10 at a predetermined intersection is planned in the presented driving plan, the presentation processing unit 33 causes an image or an icon indicating the predetermined intersection and a right or left turn at this intersection to appear on the display. Alternatively, the presentation processing unit 33 may output a voice signal representing the predetermined intersection and a right or left turn at this intersection from the speaker. In addition, when transfer of driving control to the driver is planned in the presented driving plan, the presentation processing unit 33 causes an image or an icon indicating a transition demand to appear on the display, before the vehicle 10 reaches a point at which autonomous driving control will be finished. Alternatively, the presentation processing unit 33 may output a voice signal indicating a transition demand from the speaker. In this case, the presentation processing unit 33 may notify the driver of a transition demand via two or more types of notification devices.

The control unit 34 controls components of the vehicle 10 to make the vehicle 10 travel according to the first and second driving plans received from the driving planning unit 32. In the present embodiment, while the vehicle 10 is traveling on the first section, i.e., until the vehicle 10 reaches the control switching point, the control unit 34 controls the vehicle 10 so that the vehicle 10 travels according to the first driving plan. While the vehicle 10 is traveling on the second section beyond the control switching point, the control unit 34 controls the vehicle 10 so that the vehicle 10 travels according to the second driving plan. The control unit 34 determines whether the vehicle 10 has reached the control switching point, based on the latest position of the vehicle 10 measured by the GPS receiver 3.

The control unit 34 generates a trajectory to be traveled by the vehicle 10 (hereafter simply a "planned trajectory") according to a driving plan, of the first and second driving plans, used for controlling the vehicle 10 in the section being traveled by the vehicle 10. For example, when the driving plan used for controlling the vehicle 10 includes one or more lane changes for the vehicle 10 to move to a target lane, the control unit 34 generates a planned trajectory to move from the host vehicle lane to the target lane. When the driving plan used for controlling the vehicle 10 does not include a lane change, the control unit 34 generates a line on the center of the host vehicle lane as a planned trajectory. The control unit 34 generates a planned trajectory by referring to the current map until the vehicle 10 reaches the control switching point, and to the alternative map after the vehicle 10 reaches the control switching point.

The control unit 34 measures the position of the vehicle 10 at predetermined intervals, and compares the measured position of the vehicle 10 with the planned trajectory generated according to the driving plan made for the section being traveled by the vehicle 10. The control unit 34 measures the correct position of the vehicle 10 by comparing an image obtained by the camera 2 with a map used for generating the planned trajectory, in a manner similar to that described in relation to the driving planning unit 32. When the measured position of the vehicle 10 is on the planned trajectory, the control unit 34 determines the steering angle of the vehicle 10 so that the vehicle 10 proceeds along the planned trajectory, and controls the steering of the vehicle 10 so that the steering angle is the same as determined. When the measured position of the vehicle 10 is apart from the planned trajectory, the control unit 34 determines the steering angle of the vehicle 10 so that the vehicle 10 approaches the planned trajectory, and controls the steering of the vehicle 10 so that the steering angle is the same as determined. Further, the control unit 34 controls the accelerator and the brake so that the speed of the vehicle 10 approaches a target speed. When the driving plan includes a stop of the vehicle 10 at a particular point, the control unit 34 controls the accelerator and the brake so that the vehicle 10 stops at the particular point.

Further, the control unit 34 sets the acceleration or deceleration of the vehicle 10 so as to keep the distance between the vehicle 10 and another vehicle traveling ahead (hereafter a "vehicle ahead") above a certain distance. To achieve this, the control unit 34 detects a vehicle ahead by inputting an image obtained by the camera 2 or a ranging signal obtained by a range sensor (not illustrated) into a classifier that has been trained to detect a vehicle. The control unit 34 then estimates the distance between the vehicle 10 and the vehicle ahead, based on the size of the vehicle ahead in the image or the bottom position of the region representing the vehicle ahead or based on that distance in the direction to the detected vehicle ahead which is indicated by the ranging signal. When the distance between the vehicle 10 and the vehicle ahead falls below a predetermined distance threshold, the control unit 34 sets the acceleration or deceleration of the vehicle 10 to decelerate the vehicle 10. When the distance between the vehicle 10 and the vehicle ahead is not less than the predetermined distance threshold, the control unit 34 sets the acceleration or deceleration of the vehicle 10 so that the speed of the vehicle 10 is kept constant or approaches the regulation speed of a road being traveled by the vehicle 10 or a target speed set by the driver. Then the control unit 34 sets the degree of accelerator opening or the amount of braking according to the set acceleration or deceleration. The control unit 34 determines the amount of fuel injection according to the set degree of accelerator opening, and outputs a control signal depending on the amount of fuel injection to a fuel injector of an engine of the vehicle 10. Alternatively, the control unit 34 determines electric power to be supplied to a motor according to the set degree of accelerator opening, and controls a driving circuit of the motor so that the determined electric power is supplied to the motor. Alternatively, the control unit 34 outputs a control signal depending on the set amount of braking to the brake of the vehicle 10.

Figure 7:
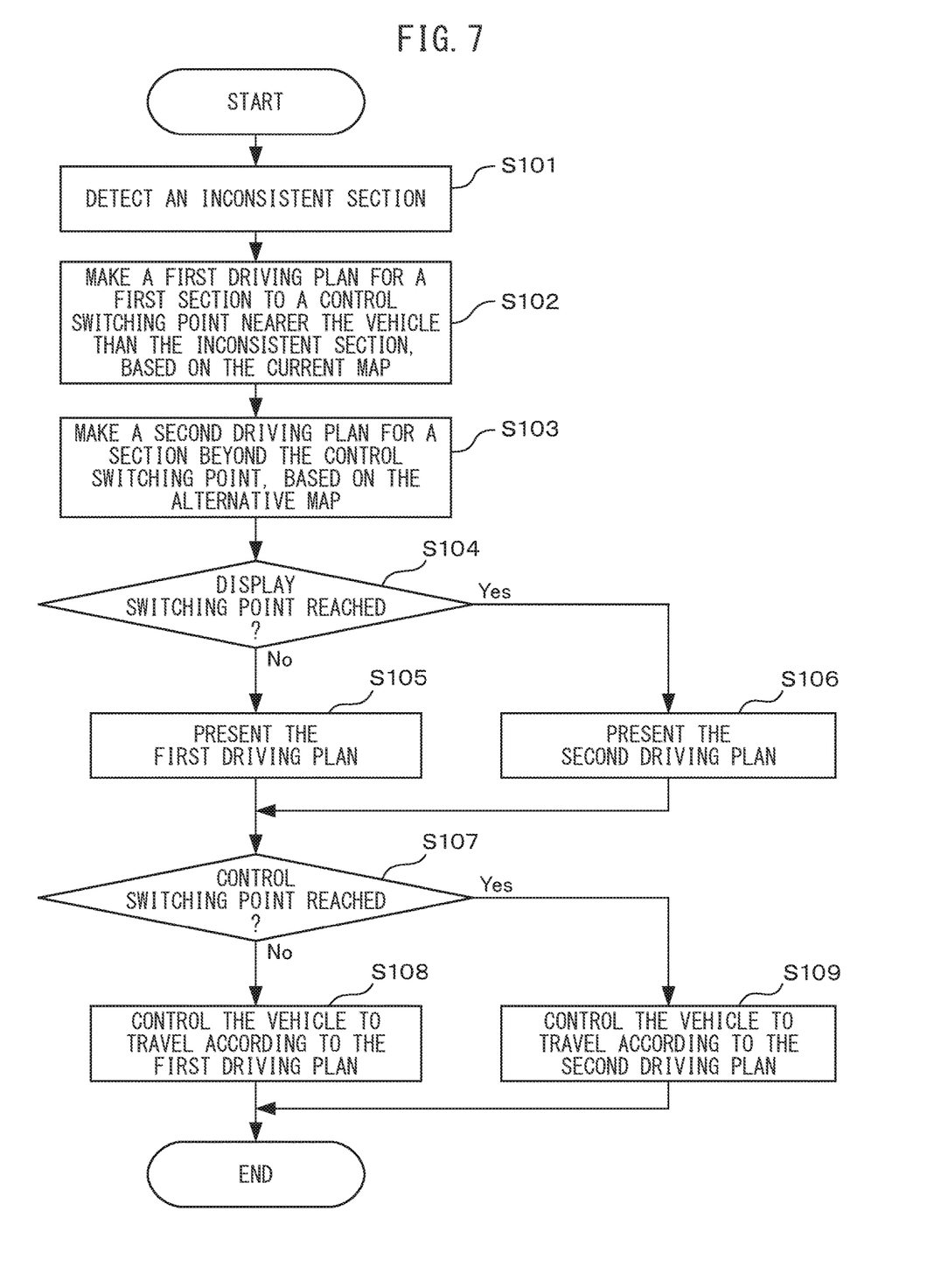
FIG. 7 is an operation flowchart of the vehicle control process.

FIG. 7 is an operation flowchart of the vehicle control process executed by the processor 23. Every time the vehicle 10 travels a predetermined distance or a predetermined time elapses, the processor 23 executes the vehicle control process in accordance with the operation flowchart described below.

The inconsistent-section detection unit 31 of the processor 23 detects an inconsistent section where information on a road being traveled by the vehicle 10 represented in the first map is inconsistent with the information represented in the second map, in a section from the current position of the vehicle 10 to a predetermined distance away in the travel direction of the vehicle 10 (step S101). The driving planning unit 32 of the processor 23 makes a first travel plan for a first section from a current position of the vehicle 10 to a control switching point which is a start point of the inconsistent section or is nearer the vehicle 10 than the start point, by referring to the current map (step S102). In addition, the driving planning unit 32 makes a second travel plan for a second section beyond the control switching point including the inconsistent section, by referring to the alternative map (step S103).

The presentation processing unit 33 of the processor 23 determines whether the vehicle 10 has reached a display switching point (step S104). When the vehicle 10 has not reached the display switching point (No in step S104), the presentation processing unit 33 presents the first driving plan to the driver via the notification device (step S105). When the vehicle 10 has reached the display switching point (Yes in step S104), the presentation processing unit 33 presents the second driving plan to the driver via the notification device (step S106).

The control unit 34 of the processor 23 determines whether the vehicle 10 has reached the control switching point (step S107). When the vehicle 10 has not reached the control switching point (No in step S107), the control unit 34 controls the vehicle 10 so that the vehicle 10 travels according to the first driving plan (step S108). When the vehicle 10 has reached the control switching point (Yes in step S107), the control unit 34 controls the vehicle 10 so that the vehicle 10 travels according to the second driving plan (step S109). After step S108 or S109, the processor 23 terminates the vehicle control process.

As has been described above, the vehicle controller detects an inconsistent section where two pieces of information on a road being traveled by the vehicle represented in two maps are inconsistent with each other. Before the vehicle 10 reaches a control switching point which is a start point of the inconsistent section or is nearer the vehicle than the start point, the vehicle controller also makes a driving plan for a section beyond the control switching point including the inconsistent section. Thus, even when there is an inconsistent section ahead of the vehicle, the vehicle controller can set a driving plan at an appropriate timing so as to avoid a sudden change of driving plans. Thus the vehicle controller can prevent the driver from feeling unnatural because of a sudden change of driving plans.

According to a modified example, a map server may execute processing similar to the processing of the inconsistent-section detection unit 31, thereby detecting an inconsistent section. In this case, when delivering first and second maps to the vehicle 10, the map server also delivers inconsistent-section information for identifying an inconsistent section included in a region represented in the first and second maps. In this case, the storage device 5 also stores inconsistent-section information received via the wireless communication terminal 4. By referring to the inconsistent-section information, the inconsistent-section detection unit 31 identifies an inconsistent section within a predetermined distance of the current position of the vehicle 10 along the travel direction of the vehicle 10. According to this modified example, the computational burden of the processor 23 of the ECU 6 is reduced.

The computer program for achieving the functions of the processor 23 of the ECU 6 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
 a memory configured to store a first map and a second map each representing information on a road; and
 a processor configured to:
  detect, in a travel direction of a vehicle, an inconsistent section where information on the road represented in the first map is inconsistent with information on the road represented in the second map,
  make a first driving plan for a first section from a current position of the vehicle to a control switching point which is a start point of the inconsistent section, which is an end of the inconsistent section closer to the vehicle, or is nearer the vehicle than the start point, based on one of the first and second maps,
  make a second driving plan for a second section beyond the control switching point including the inconsistent section, based on the other of the first and second maps, which differs from the one used for the first section, before the vehicle reaches the control switching point,
  control the vehicle so that the vehicle travels on the first section according to the first driving plan, and
  control the vehicle so that the vehicle travels on the second section according to the second driving plan.

2. The vehicle controller according to claim 1, wherein the processor makes the first driving plan, based on the first map, and makes the second driving plan, based on the second map, and
 the information on the road represented in the first map is more accurate than the information on the road represented in the second map, and the second map is updated more frequently than the first map.

3. The vehicle controller according to claim 1, wherein the processor detects the inconsistent section so that the distance between the position of a predetermined feature on or around the road represented in the first map and the position of the predetermined feature represented in the second map is not less than a predetermined threshold, or so as to include a point where the first and second maps differ in the presence or absence of the predetermined feature.

4. A method for vehicle control, comprising:
 detecting, in a travel direction of a vehicle, an inconsistent section where information on a road represented in a first map is inconsistent with information on the road represented in a second map;
 making a first driving plan for a first section from a current position of the vehicle to a control switching point which is a start point of the inconsistent section, which is an end of the inconsistent section closer to the vehicle, or is nearer the vehicle than the start point, based on one of the first and second maps;

making a second driving plan for a second section beyond the control switching point including the inconsistent section, based on the other of the first and second maps, which differs from the one used for the first section, before the vehicle reaches the control switching point;

controlling the vehicle so that the vehicle travels on the first section according to the first driving plan; and controlling the vehicle so that the vehicle travels on the second section according to the second driving plan.

5. A non-transitory recording medium that stores a computer program for vehicle control, the computer program causing a processor mounted on a vehicle to execute a process comprising:

detecting, in a travel direction of the vehicle, an inconsistent section where information on a road represented in a first map is inconsistent with information on the road represented in a second map;

making a first driving plan for a first section from a current position of the vehicle to a control switching point which is a start point of the inconsistent section, which is an end of the inconsistent section closer to the vehicle, or is nearer the vehicle than the start point, based on one of the first and second maps;

making a second driving plan for a second section beyond the control switching point including the inconsistent section, based on the other of the first and second maps, which differs from the one used for the first section, before the vehicle reaches the control switching point;

controlling the vehicle so that the vehicle travels on the first section according to the first driving plan; and controlling the vehicle so that the vehicle travels on the second section according to the second driving plan.

\* \* \* \* \*